US012060719B2

(12) United States Patent
Morijiri et al.

(10) Patent No.: US 12,060,719 B2
(45) Date of Patent: Aug. 13, 2024

(54) BINDING MACHINE

(71) Applicant: MAX CO., LTD., Tokyo (JP)

(72) Inventors: Takeshi Morijiri, Tokyo (JP); Nobutaka Tashima, Tokyo (JP); Shinpei Sugihara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 408 days.

(21) Appl. No.: 17/273,337

(22) PCT Filed: Sep. 5, 2019

(86) PCT No.: PCT/JP2019/035090
§ 371 (c)(1),
(2) Date: Mar. 4, 2021

(87) PCT Pub. No.: WO2020/050386
PCT Pub. Date: Mar. 12, 2020

(65) Prior Publication Data

US 2021/0340781 A1 Nov. 4, 2021

(30) Foreign Application Priority Data

Sep. 7, 2018 (JP) ................................ 2018-168251

(51) Int. Cl.
*E04G 21/12* (2006.01)
*B21F 15/04* (2006.01)
(Continued)

(52) U.S. Cl.
CPC ............ *E04G 21/123* (2013.01); *B21F 15/04* (2013.01); *B25B 25/00* (2013.01); *B65B 13/025* (2013.01); *B65B 13/285* (2013.01)

(58) Field of Classification Search
CPC .......... B21F 15/00; B21F 15/02; B21F 15/04; B65B 13/22; B65B 13/28; B65B 13/285; B65B 13/025; B25B 25/00; E04G 21/123
See application file for complete search history.

(56) References Cited

U.S. PATENT DOCUMENTS 4,354,535 A * 10/1982 Powell .................. E04G 21/122 140/93 A
5,323,816 A * 6/1994 Hoyaukin ............. E04G 21/122 140/57

(Continued)

FOREIGN PATENT DOCUMENTS

CN 1193371 A 9/1998
CN 1066649 C 6/2001

(Continued)

OTHER PUBLICATIONS

European Office Action (Communication pursuant to Article 94(3) EPC) dated Feb. 16, 2023, issued by the European Patent Office in the corresponding European Patent Application No. 19856826.3. (6 pages).

(Continued)

*Primary Examiner* — Bobby Yeonjin Kim
(74) *Attorney, Agent, or Firm* — Banner & Witcoff, Ltd.

(57) ABSTRACT

A binding machine includes: a first main unit that has a pair of grips that an operator can hold; a second main unit that has a curl guide for curling a wire around an object to be bound, and a twisting unit including a twisting shaft to twist the curled wire; and a link unit that links the first main unit and the second main unit. The grips are provided on either side of the axis line of the link unit or an extended line of the axis line as seen from the operator side when the operator is holding the grips to manipulate.

9 Claims, 8 Drawing Sheets

(51) Int. Cl.

| | |
|---|---|
| ***B25B 25/00*** | (2006.01) |
| ***B65B 13/02*** | (2006.01) |
| ***B65B 13/28*** | (2006.01) |

(56) References Cited

U.S. PATENT DOCUMENTS

| | | | | |
|---|---|---|---|---|
| 5,682,927 | A * | 11/1997 | Takahashi | E04G 21/123 140/119 |
| 5,937,916 | A | 8/1999 | Hoyaukin | |
| 5,947,166 | A | 9/1999 | Doyle et al. | |
| 6,588,109 | B2 * | 7/2003 | Wilson | A01D 34/416 30/276 |
| 7,290,570 | B1 * | 11/2007 | Spikes | B21F 7/00 140/93.6 |
| 7,347,276 | B2 * | 3/2008 | Basek | A01B 1/14 16/444 |
| 8,528,472 | B2 | 9/2013 | Sacher | |
| 8,881,408 | B2 * | 11/2014 | Martinsson | B27B 17/0008 30/381 |
| 9,457,921 | B2 * | 10/2016 | Barnes | B65B 13/185 |
| 9,591,809 | B2 * | 3/2017 | Gieske | B25G 3/12 |
| 10,323,425 | B2 * | 6/2019 | Itagaki | E04G 21/123 |
| 11,365,552 | B2 * | 6/2022 | Morijiri | B21F 15/04 |
| 2004/0229195 | A1 | 11/2004 | Marggraff et al. | |
| 2006/0033725 | A1 | 2/2006 | Marggraff et al. | |
| 2006/0042713 | A1 * | 3/2006 | Cheng | B21F 15/04 140/123 |
| 2006/0066591 | A1 | 3/2006 | Marggraff et al. | |
| 2006/0067576 | A1 | 3/2006 | Marggraff et al. | |
| 2006/0067577 | A1 | 3/2006 | Marggraff et al. | |
| 2006/0077184 | A1 | 4/2006 | Marggraff et al. | |
| 2006/0078866 | A1 | 4/2006 | Marggraff et al. | |
| 2006/0080608 | A1 | 4/2006 | Marggraff et al. | |
| 2006/0080609 | A1 | 4/2006 | Marggraff | |
| 2006/0125805 | A1 | 6/2006 | Marggraff | |
| 2006/0127872 | A1 | 6/2006 | Marggraff | |
| 2006/0157139 | A1 * | 7/2006 | Hoyaukin | E04G 21/123 140/119 |
| 2006/0292543 | A1 | 12/2006 | Marggraff et al. | |
| 2009/0055008 | A1 | 2/2009 | Marggraff et al. | |
| 2011/0279415 | A1 | 11/2011 | Marggraff et al. | |
| 2011/0313771 | A1 | 12/2011 | Marggraff | |
| 2012/0004750 | A1 | 1/2012 | Marggraff et al. | |
| 2018/0207710 | A1 | 7/2018 | Itagaki et al. | |
| 2018/0332766 | A1 * | 11/2018 | Ackerman | A01D 34/902 |

FOREIGN PATENT DOCUMENTS

| | | | |
|---|---|---|---|
| CN | 101353088 | A | 1/2009 |
| CN | 206165188 | U | 5/2017 |
| CN | 107849859 | A | 3/2018 |
| CN | 207314873 | U | 5/2018 |
| JP | H07-290177 | A | 11/1995 |
| JP | 2006-520965 | A | 9/2006 |
| JP | 2017-189822 | A | 10/2017 |
| TW | M552524 | U | 12/2017 |

OTHER PUBLICATIONS

International Search Report issued in Application No. PCT/JP2019/035090 dated Nov. 19, 2019, 3 pages.

Written Opinion issued in Application No. PCT/JP2019/035090 dated Nov. 19, 2019, 4 pages.

* cited by examiner

BINDING MACHINE

CROSS REFERENCE TO RELATED APPLICATION

This application is a 35 U.S.C. 371 National Phase Entry Application from PCT/JP2019/035090, filed Sep. 5, 2019, which claims priority to Japanese Patent Application No. 2018-168251, filed Sep. 7, 2018, the disclosures of which are incorporated herein in their entirety by reference, and priority is claimed to each of the foregoing.

TECHNICAL FIELD

The present disclosure relates to a binding machine configured to bind a binding object such as a reinforcing bar and the like with a wire rod such as a wire.

BACKGROUND ART

PTL 1 discloses a machine including an outer cylindrical casing, two fixing claws connected to a tip end of the outer cylindrical casing and configured to arrange a wire so as to surround a binding object such as a reinforcing bar, a twisting mechanism arranged in the outer cylindrical casing and configured to twist two leg portions of the wire, and a handle connected to a rear end of the outer cylindrical casing via a telescopic part capable of adjusting a length thereof. According to the machine, since an entire length of the machine can be increased by extending the telescopic part, it is convenient to bind reinforcing bars and the like distant from an operator.

PTL 1: JP 2006-520965 A

SUMMARY OF INVENTION

However, when the entire length increases, a weight of the machine increases and the machine is enlarged, which deteriorates a handling property. Particularly, since the machine has a single handle, the operator should operate the machine with one hand when performing the binding. For this reason, when the machine is enlarged, the burden on an arm and a shoulder on a side of the operator grasping the handle increases, and it is difficult to perform an operation with one hand.

In response to the above issue, it is an object of the present disclosure to provide a binding machine configured to suppress burden on an arm and a shoulder of an operator from increasing even though the binding machine has a long entire length capable of binding reinforcing bars and the like distant from the operator.

A binding machine according to one aspect of the present disclosure includes a first body part having a pair of grips that can be grasped by an operator, a second body part having a curl guide configured to curl a wire around a binding object and a twisting unit including a twisting shaft for twisting the curled wire, and a connecting part connecting the first body part and the second body part each other. The pair of grips are provided on respective both sides of an axis line of the connecting part or an extension line of the axis line, as seen from an operator-side when the operator grasps and operates the grips.

According to the one aspect of the present disclosure, since the pair of grips is provided on respective both sides of the axis line of the connection part or the like, as seen from the operator-side, the operator can grasp the grips with both hands. Thereby, it is possible to reduce the burden on an arm, a shoulder and the like of the operator during a binding operation.

DESCRIPTION OF EMBODIMENTS

Hereinbelow, preferred embodiments of the present disclosure will be described with reference to the drawings.

First Embodiment

Figure 1:
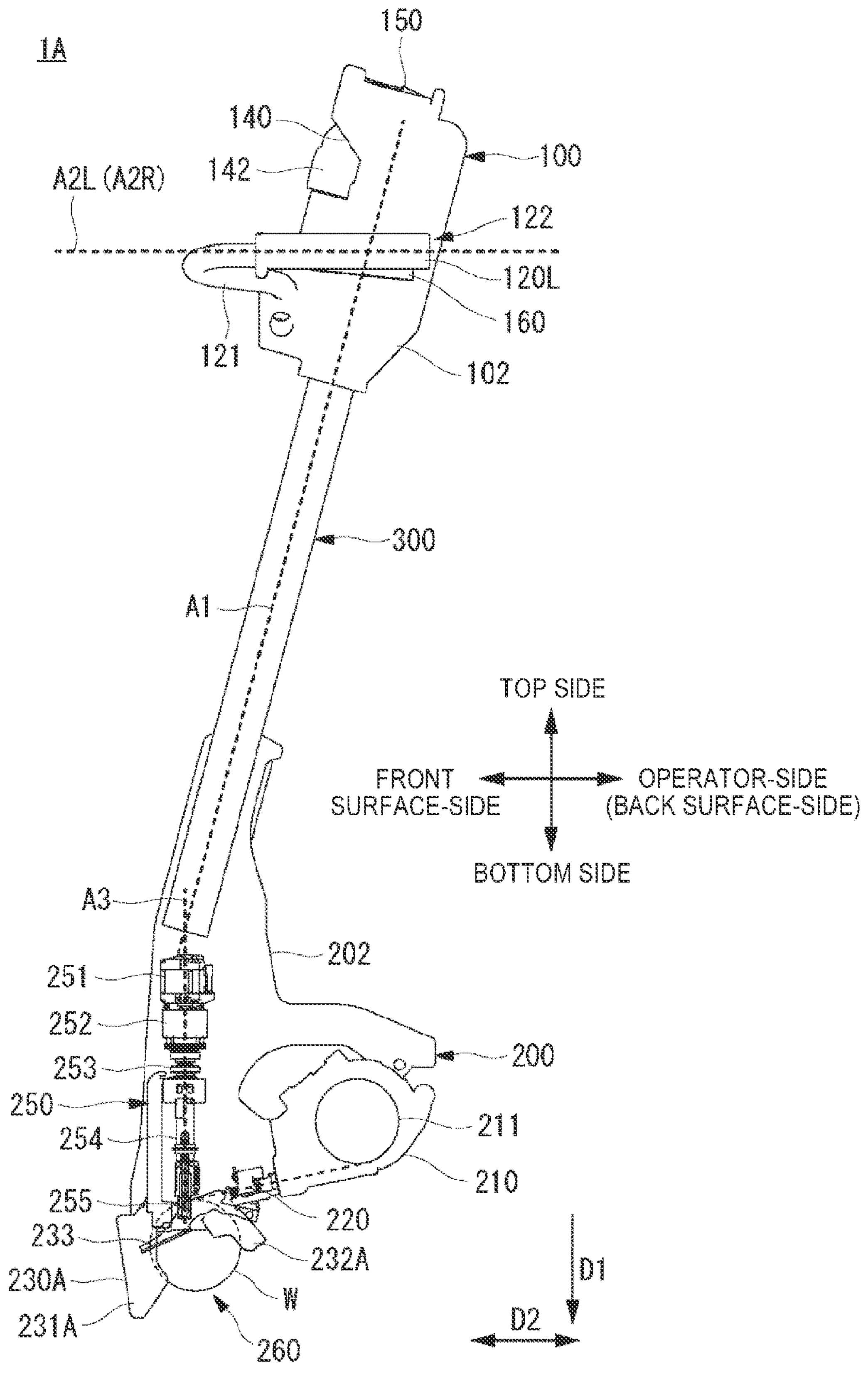
FIG. 1 is a side view depicting an internal configuration of a reinforcing bar binding machine of a first embodiment.
Figure 2:
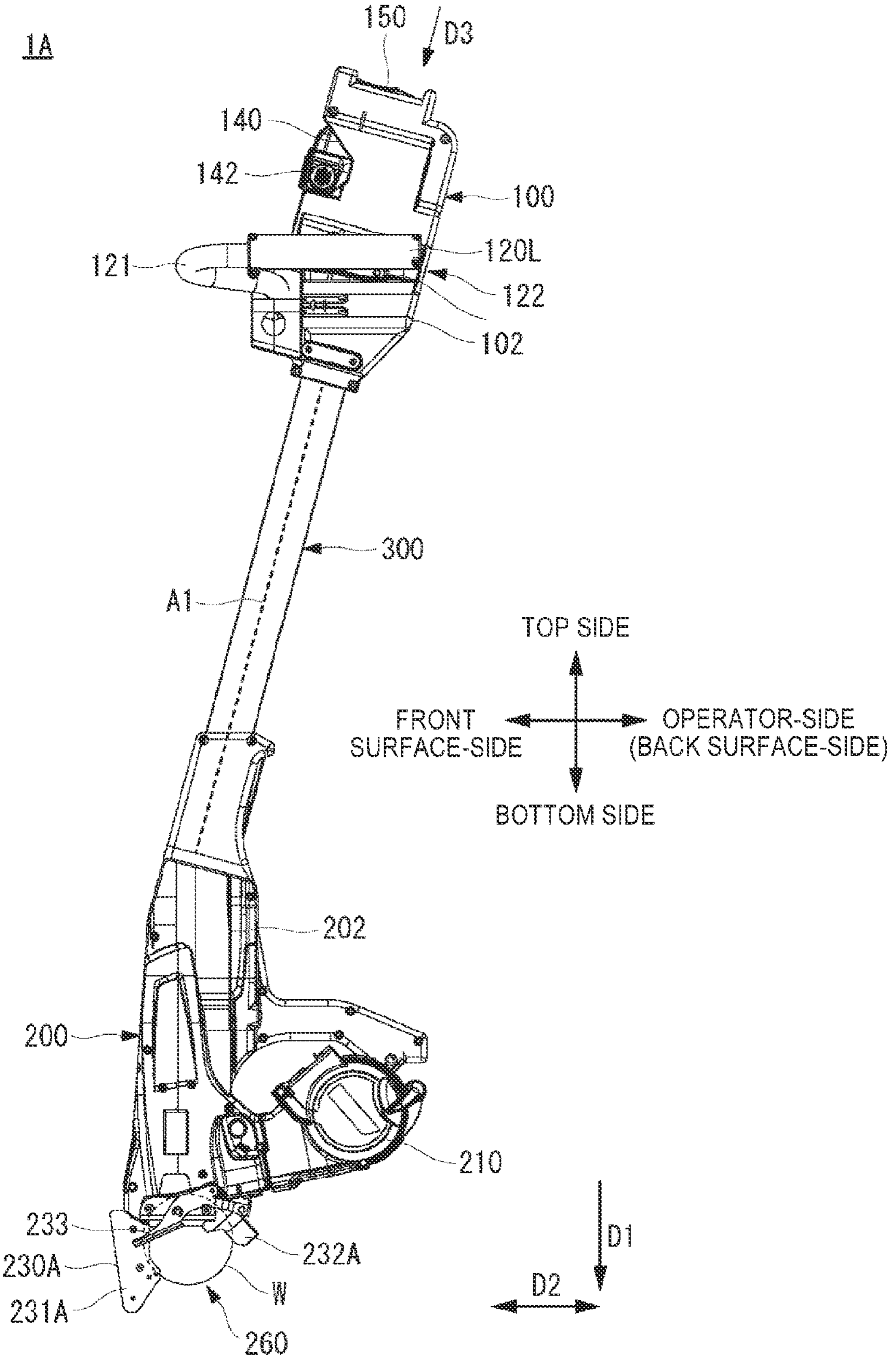
FIG. 2 is a side view depicting an external configuration of the reinforcing bar binding machine of the first embodiment.
Figure 4:
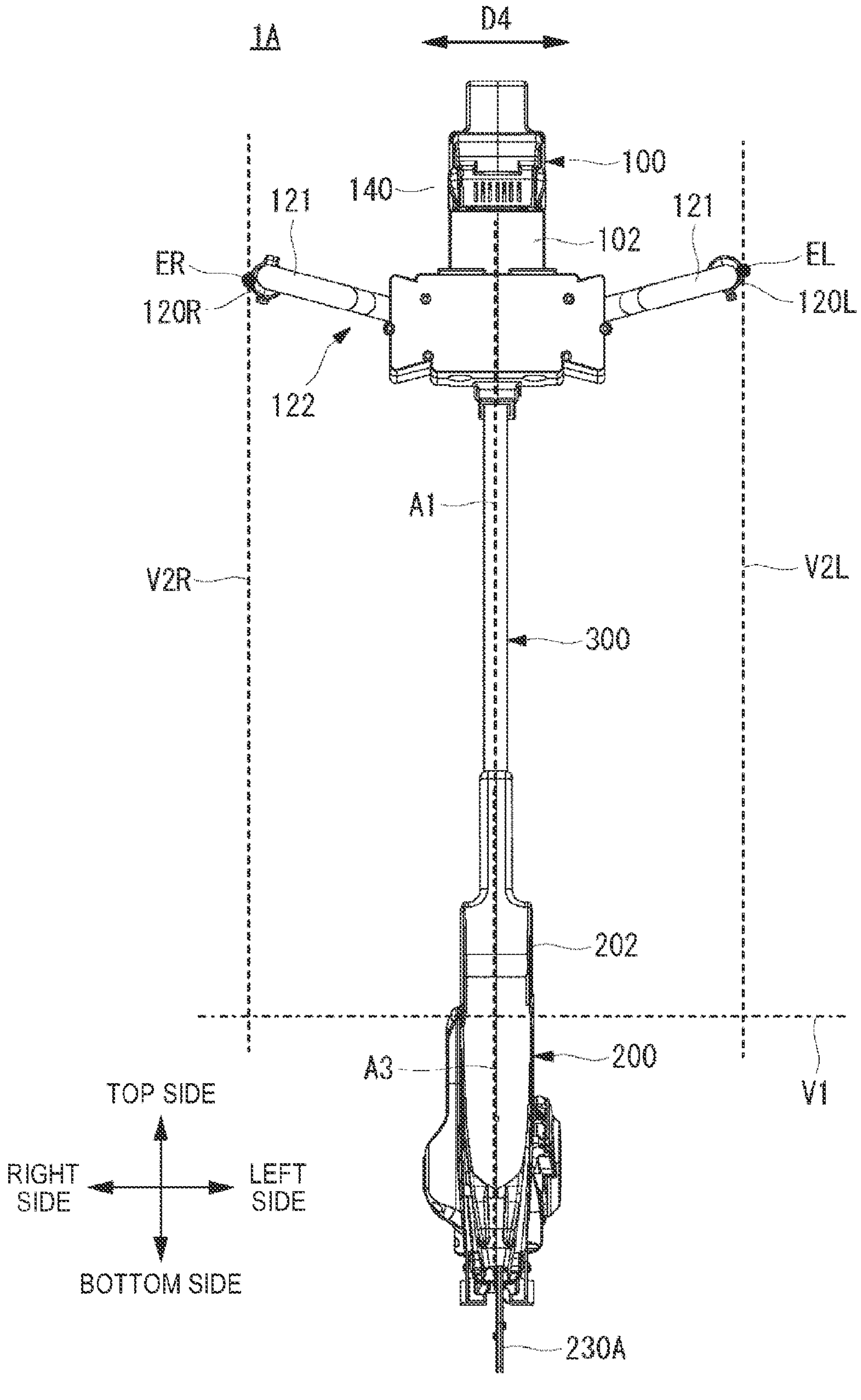
FIG. 4 is a front view depicting the external configuration of the reinforcing bar binding machine of the first embodiment.
Figure 5:
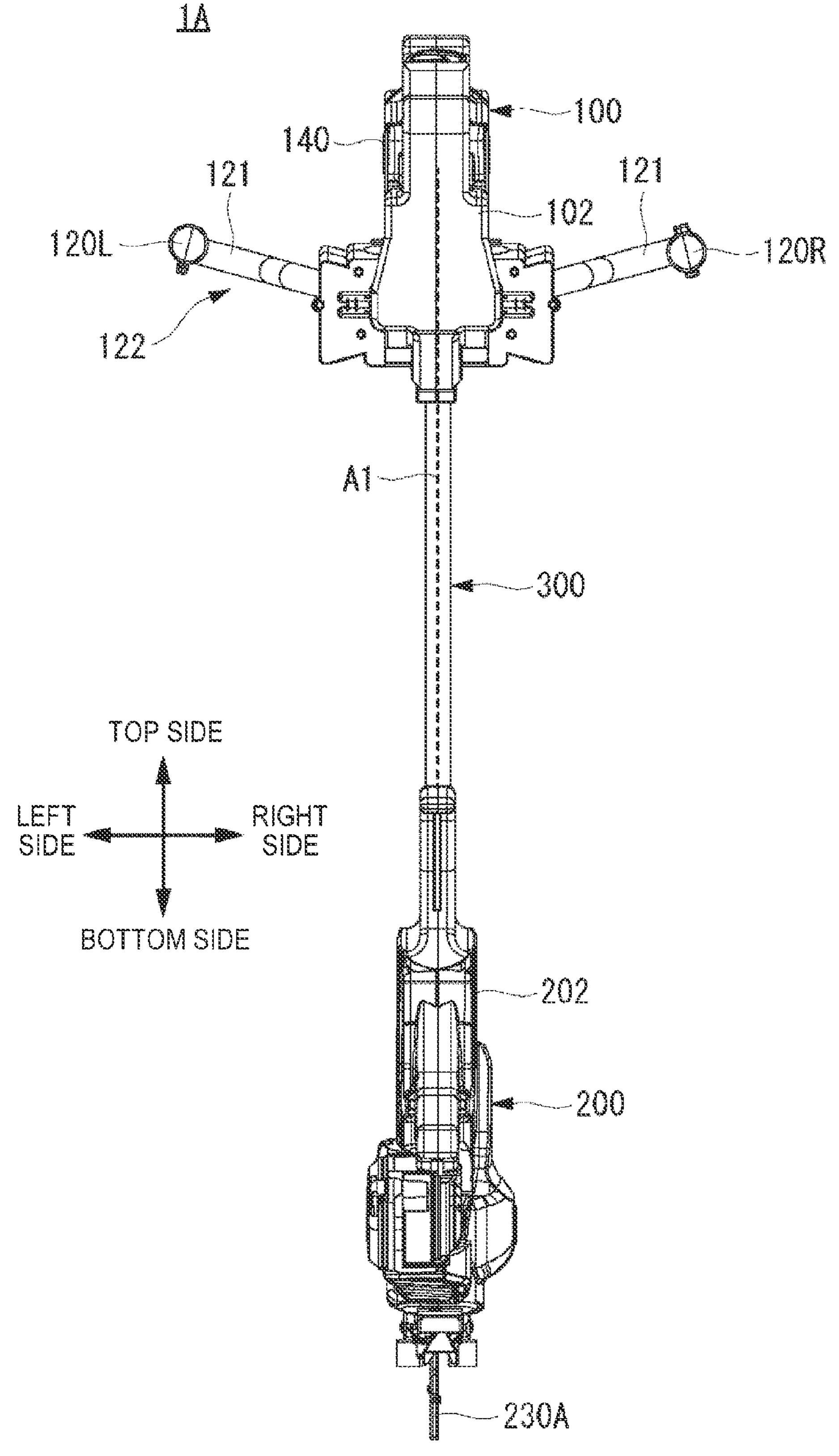
FIG. 5 is a rear view depicting the external configuration of the reinforcing bar binding machine of the first embodiment.
Figure 6:
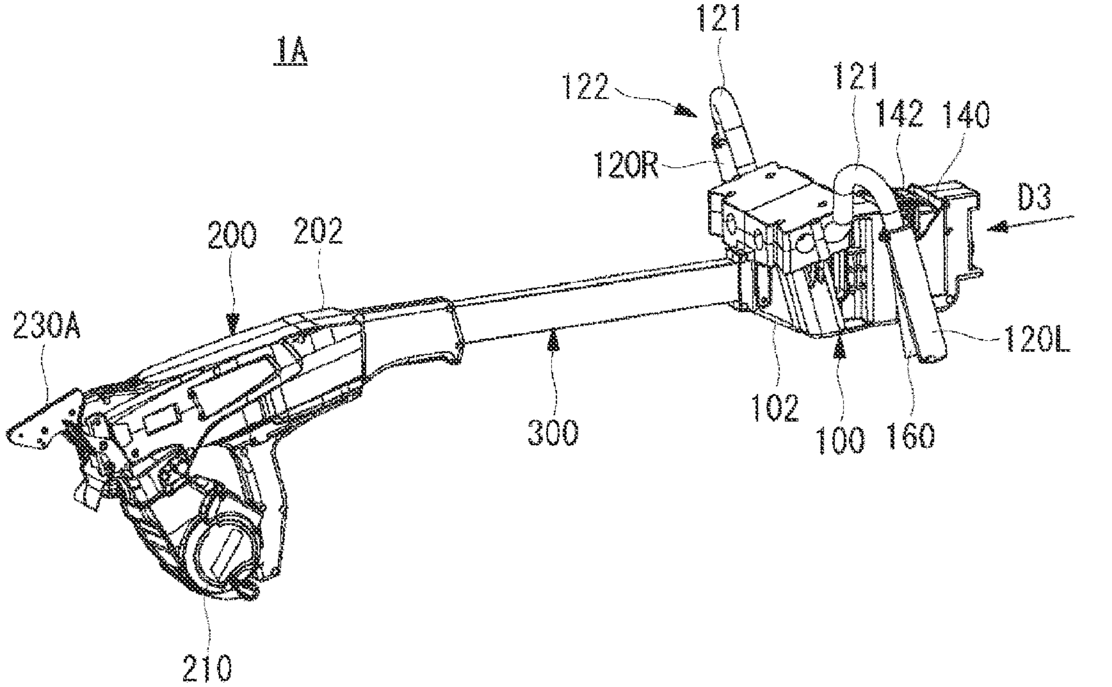
FIG. 6 is a perspective view depicting the external configuration of the reinforcing bar binding machine of the first embodiment.
Figure 7:
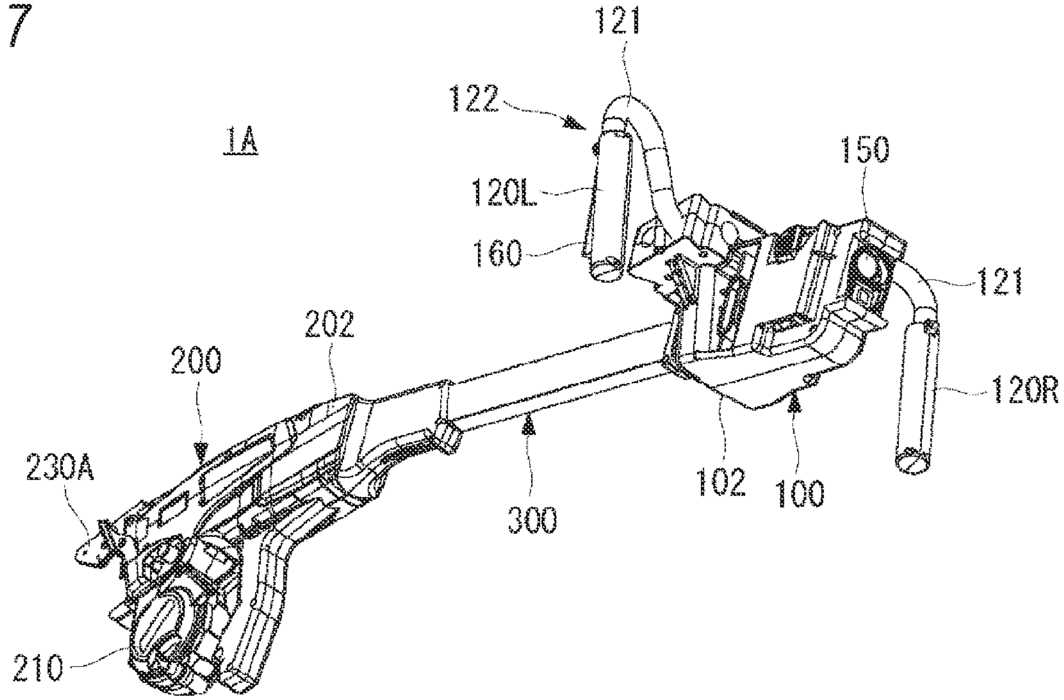
FIG. 7 is a perspective view depicting the external configuration of the reinforcing bar binding machine of the first embodiment.
Figure 8:
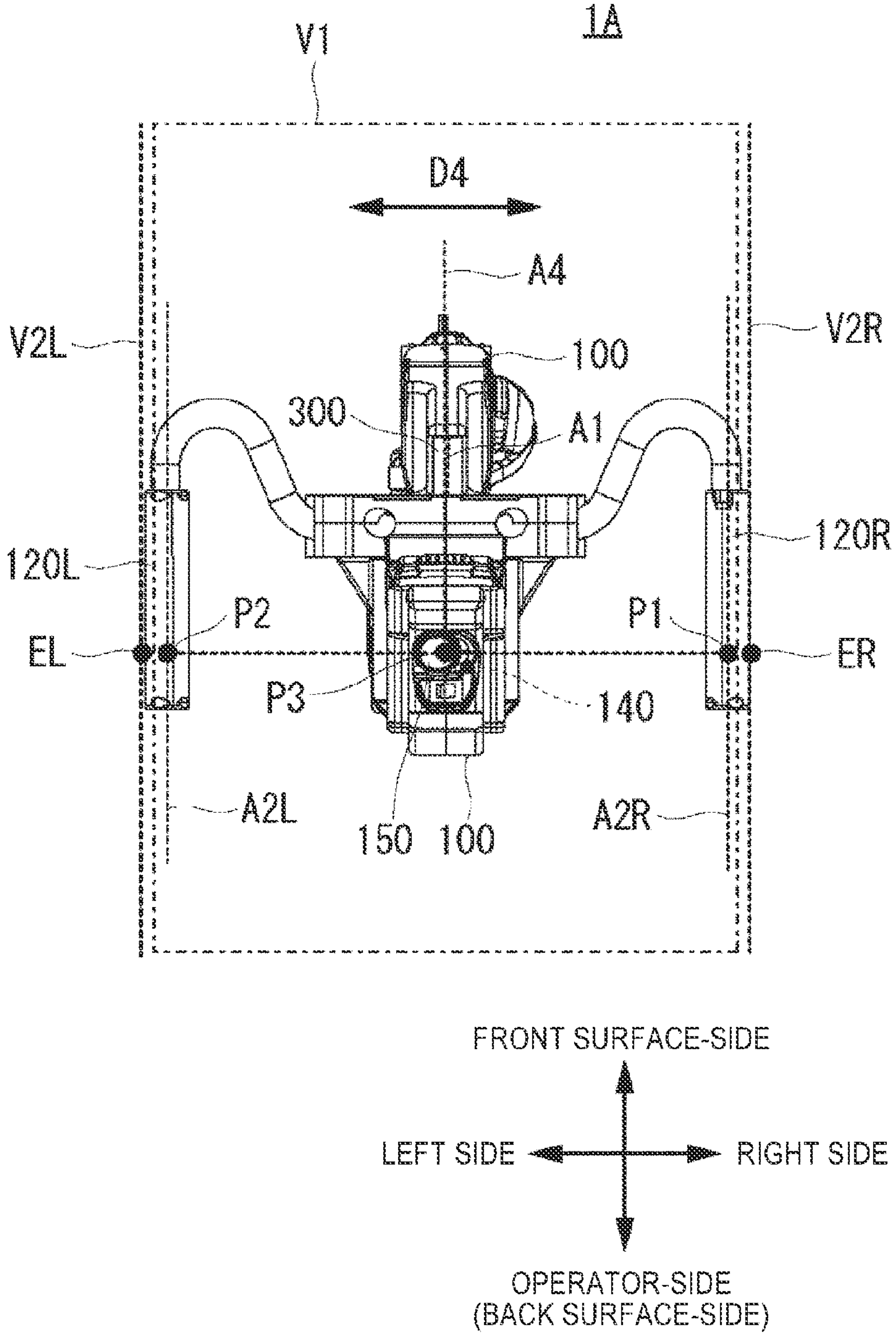
FIG. 8 is a plan view depicting the external configuration of the reinforcing bar binding machine of the first embodiment.

FIG. 1 is a side view depicting an internal configuration of a reinforcing bar binding machine 1A of a first embodiment, and FIG. 2 is a side view depicting an external configuration of the reinforcing bar binding machine 1A. FIG. 4 is a front view depicting the external configuration of the reinforcing bar binding machine 1A, FIG. 5 is a rear view, FIGS. 6 and 7 are perspective views, and FIG. 8 is a plan view.

[Configuration Example of Reinforcing Bar Binding Machine 1A]

A reinforcing bar binding machine 1A includes a first body part 100 having a handle part 122 including a pair of grips 120R and 120L that can be grasped by an operator, a second body part 200 having a curl guide 230A configured to curl a wire W around a binding object and a twisting unit 250 configured to hold and twist the wire W curled by the curl guide 230A, and an elongated connecting part 300 configured to connect the first body part 100 and the second body part 200 each other.

In the first embodiment, a side on which the curl guide 230A is provided is referred to a tip end-side or a bottom side of the reinforcing bar binding machine 1A, and an opposite side, i.e., an end portion-side of the first body part 100 is referred to as a base end-side or a top side of the reinforcing bar binding machine 1A. Sides which are orthogonal to a vertical direction of the reinforcing bar binding machine 1A and on which the grips 120R and 120L are positioned are referred to as sides of the reinforcing bar binding machine 1A, and the grip 120R-side is referred to as a right side of the reinforcing bar binding machine 1A and the grip 120L-side is referred to as a left side of the reinforcing bar binding machine 1A. A side which is orthogonal to the vertical direction and the right and left direction of the reinforcing bar binding machine 1A and on which an operator who grasps the grips 120R and 120L stands is referred to as an operator-side or a back surface-side of the reinforcing bar binding machine 1A, and an opposite side is referred to as a front surface-side of the reinforcing bar binding machine 1A.

The first body part 100 has a first housing 102, a handle part 122 attached to the first housing 102 and having the pair of grips 120R and 120L, and a battery mounting part 140 provided to the first housing 102 and configured to mount a battery 142. A tip end-side of the first housing 102 is connected to the connecting part 300, and a base end-side thereof is provided with a setting unit 150 for setting a variety of operation conditions of the reinforcing bar binding machine 1A.

As shown in FIGS. 6 and 7, the handle part 122 is constituted by a U-shaped or M-shaped long member, as seen in an axis line direction D3 of the connecting part 300, and has the grips 120R and 120L on both ends thereof. A grip connecting part 121 is provided between the grips 120R and 120L and is attached to the first housing 102. At least one of the grips 120R and 120L is provided with an operation switch 160 (refer to FIG. 1) for starting a binding operation. Note that, the handle part 122 may have diverse shapes, such as a linear shape as seen in the axis line direction D3 of the connecting part 300 and a U-shape or M-shape as seen in the front surface or back surface direction.

As shown in FIGS. 4 and 5, the grips 120R and 120L are provided on respective both sides of an axis line A3 of the connecting part 300 or an extension line of the axis line A3, as seen from the operator-side, when the operator grasps and operates the grips 120R and 120L. The grip 120R is arranged on the right side of the axis line A3, as seen from the operator-side, and the grip 120L is arranged on the left side of the axis line A3, as seen from the operator-side.

The battery mounting part 140 is provided to the first housing 102 so as to be positioned above the handle part 122. As shown in FIGS. 2, 4 and 8, the battery mounting part 140 is also arranged between a pair of second virtual planes V2R and V2L each of which is tangent to each of outermost ends ER and EL in a width direction D4 of the pair of grips 120R and 120L (in an alignment direction of the pair of grips 120R and 120L) and is orthogonal to a first virtual plane V1 orthogonal to the twisting shaft 253. In the first embodiment, the battery mounting part 140 is arranged between the pair of grips 120R and 120L, as seen in the axis line direction D3 of the connecting part 300. A preferred arrangement position of the battery mounting part 140 is a position including an intermediate position P3 between a position P1 on an axis line A2R of the grip 120R and a position P2 on an axis line A2L of the grip 120L, as seen in the axis line direction D3, because the grips 120R and 120L are arranged at positions symmetrical with respect to the axis line A1 of the connecting part 300. As shown in FIGS. 1, 2 and 4, the battery mounting part 140 may also be arranged on an extension line of the axis line A1 of the connecting part 300.

As shown in FIG. 2 and the like, when a gravity direction is set as a bottom side, the battery mounting part 140 is arranged above the grips 120R and 120L in a state where a tip end portion of the curl guide 230A is faced toward the gravity direction. The battery mounting part 140 has a mounting opening 141 on the front surface-side of the first housing 102 of the first body part 100, and is configured so that a battery 142 can be mounted in a direction orthogonal or substantially orthogonal to the axis line A1 of the connecting part 300. Note that, the mounting opening 141 may be provided on an upper surface-side of the first housing 102, and the battery mounting part 140 may be configured so that the battery can be mounted in the axis line direction D3 of the connecting part 300 or in substantially the axis line direction.

The setting unit 150 is a unit for adjusting the number of turns of the wire W, the twisting torque for the wire W, and the like, and is constituted by a dial-type or push-type switch, for example.

As shown in FIG. 1, the second body part 200 has a second housing (housing) 202, a reel accommodation part 210 configured to accommodate a wire reel 211 on which the wire W is wound, a wire feeding unit 220 configured to reel out and feed the wire W from the wire reel 211 accommodated in the reel accommodation part 210, a curl guide 230A configured to curl the wire W around the binding object, a cutting unit (not shown) configured to cut the wire W curled by the curl guide 230A, and a twisting unit 250 configured to hold and twist the wire W curled by the curl guide 230A and cut by the cutting unit. The curl guide 230A is provided at a tip end portion of the second housing 202, and the wire feeding unit 220, the cutting unit and the twisting unit 250 are accommodated in the second housing 202.

The wire feeding unit 220 is provided between the reel accommodation part 210 and the curl guide 230A, and has a pair of feeding gears for feeding the wire. The pair of feeding gears of the wire feeding unit 220 is configured to rotate in forward and reverse directions by drive of a motor (not shown). Thereby, when the feeding gears are rotated in the forward direction, the wire W can be fed toward the curl guide 230A, and when the feeding gears is rotated in the reverse direction, the wire W can be pulled back toward the reel accommodation part 210.

The curl guide 230A has an opening 260 in which reinforcing bars S can be inserted, and is configured to curl the wire W around the reinforcing bars S inserted in the opening 260. The curl guide 230A is provided projecting further forward (in the first direction D1) from the tip end portion of the second housing 202, and is constituted by a pair of guide parts, i.e., a first guide part 231A and a second guide part 232A. The first guide part 231A and the second guide part 232A are arranged with a prescribed gap L to constitute the opening 260 in a second direction D2 orthogonal to the first direction D1. The first guide part 231A is configured to regulate an advancing direction of the wire W fed from the wire feeding unit 220 and to curl the wire W. The second guide part 232A is configured to receive the wire W curled by the first guide part 231A and to guide the wire to the twisting unit 250. When binding the reinforcing bars S, the reinforcing bars S are inserted into the opening 260 between the first guide part 231A and the second guide part 232A.

A cover part 206 configured to cover a tip end-side end portion of the second housing 202 and a contact member 233 configured to move the second guide part 232A as the reinforcing bars S are contacted thereto are provided on a tip end-side of the second housing 202 and between the first guide part 231A and the second guide part 232A.

Figure 3A:
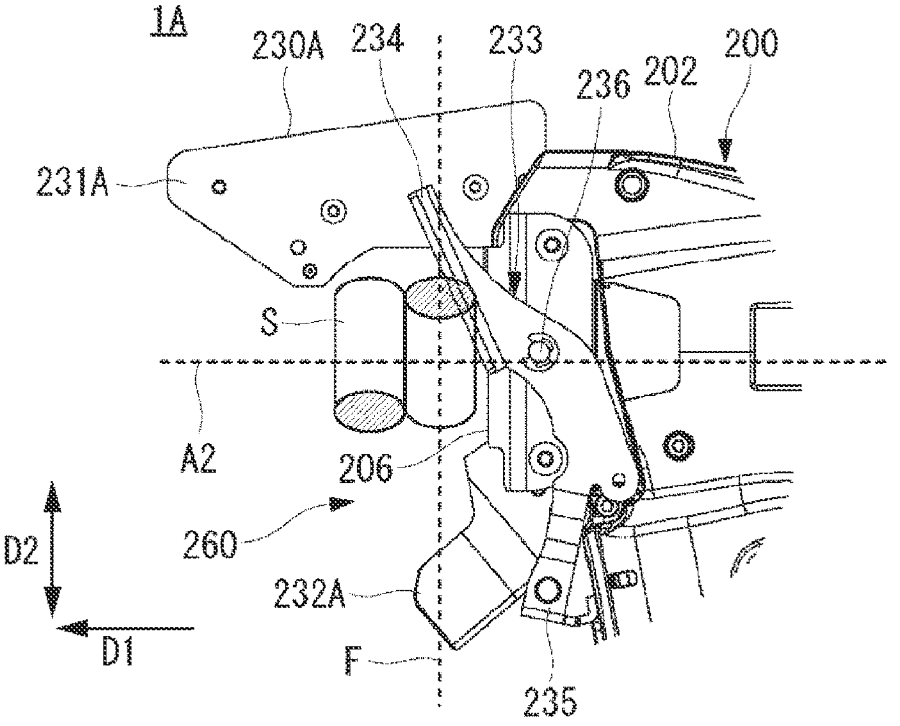
FIG. 3A is a side view depicting a configuration of main parts of a second body part of the reinforcing bar binding machine of the first embodiment.
Figure 3B:
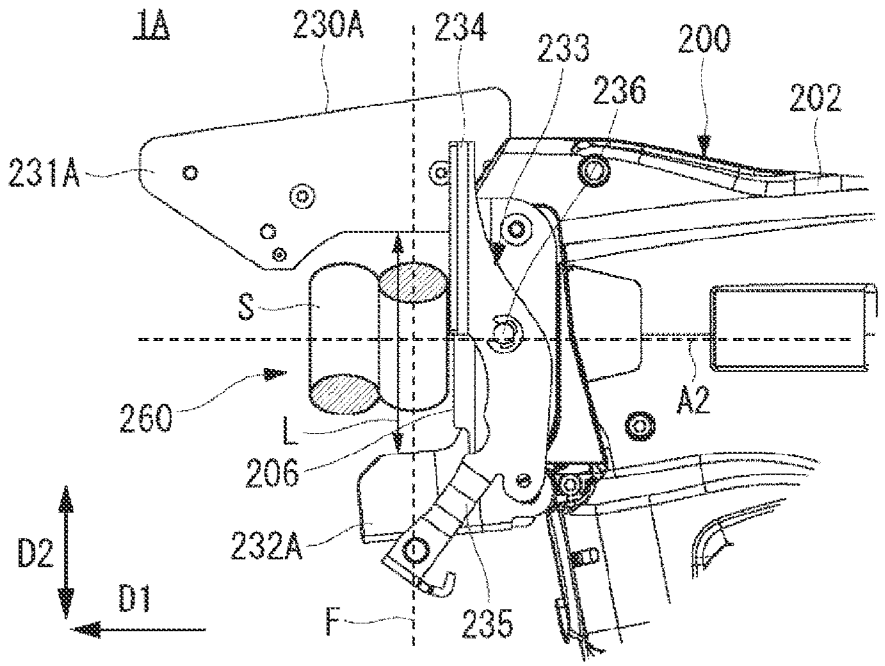
FIG. 3B is a side view depicting a configuration of main parts of the second body part of the reinforcing bar binding machine of the first embodiment.

As shown in FIGS. 3A and 3B, the cover part 206 is constituted by a metal plate member, and is attached to cover an end portion on a bottom side of the second housing 202 between a base end-side of the first guide part 231A and a base end-side of the second guide part 232A.

The contact member 233 is rotatably supported by a shaft 236 attached to the cover part 206. The contact member 233 is a dog leg-shaped member, and has a pair of contact parts 234 (only one contact part is shown in FIG. 3A and the like) extending toward the first guide part 231A and a pressing part 235 extending toward the second guide part 232A with the shaft 236 being interposed therebetween.

The contact parts 234 are arranged at positions at which the reinforcing bars S inserted in the opening 260 can contact, and the pressing part 235 is in contact with the second guide part 232A. When the contact parts 234 are pressed to the reinforcing bars S and are thus moved in an opposite direction to the first direction D1, the contact member 233 rotates about the shaft 236 as a support point. When the contact member 233 rotates as the contact parts 234 are pressed to the reinforcing bars S, the pressing part 235 pushes the second guide part 232A toward the first guide part 231A. Thereby, the second guide part 232A moves from an open position opened with respect to the first guide part 231A to a closed position. In this way, since the second guide part 232A is open with respect to the first guide part 231A until the reinforcing bars S are contacted to the contact parts 234, the reinforcing bars S can be easily inserted into the opening 260 of the curl guide 230A. In particular, in the reinforcing bar binding machine 1A having a long entire length, like the first embodiment, since a binding position is distant from the operator, it is difficult to insert the reinforcing bars S. For this reason, when the second guide part 232A is open during the binding, the reinforcing bars S can be easily inserted into the opening 260 of the curl guide 230A.

The twisting unit 250 includes a twisting motor 251, a deceleration mechanism 252 configured to perform deceleration and torque amplification of the twisting motor 251, a twisting shaft 253 connected to the deceleration mechanism 252 and configured to rotate by rotation of the twisting motor 251, a movable member 254 configured to be displaced by a rotating operation of the twisting shaft 253, and a holding part 255 projecting from a tip end-side of the movable member 254 and configured to hold and twist the wire W.

An outer peripheral surface of the twisting shaft 253 and an inner peripheral surface of the movable member 254 are each formed with screws, so that the screw of the twisting shaft 253 is in mesh with the screw of the movable member 254. When the twisting shaft 253 rotates in a state where rotation of the movable member 254 is regulated, the movable member 254 moves in the front and rear direction, and when the regulation of rotation is released, the movable member rotates integrally with the twisting shaft 253.

The holding part 255 has a plurality of claw portions for holding the wire W. The holding part 255 opens and closes as the movable member 254 moves in the front and rear direction, and rotates as the movable member 254 rotates.

The connecting part 300 is an elongated hollow member and has a wiring laid therein. The connecting part 300 is constituted by a rod-shaped member thinner than diameters of the first body part 100 and the second body part 200. A length of the connecting part 300 is selected depending on an average height and the like of the operator, for example. For the connecting part 300, for example, metal such as aluminum and stainless steel and non-metal such as resin, carbon fiber and the like can be used. Thereby, it is possible to reduce an entire weight of the reinforcing bar binding machine 1A.

A base end-side (upper end portion) of the connecting part 300 is attached to the first housing 102, and a tip end-side (lower end portion) of the connecting part 300 is attached to the second housing 202. The connecting part 300 can be configured so that it is detachably attached to the first body part 100 and the second body part 200.

The wiring laid in the connecting part 300 is connected to the battery 142 and the operation switch 160 of the first body part 100 and a control device and the like of the second body part 200. Thereby, communication of electric signals can be performed between the first body part 100 and the second body part 200, and power can be supplied from the first body part 100 to the second body part 200.

[Example of Operation of Reinforcing Bar Binding Machine 1A]

When binding the reinforcing bars S, the operator inserts the reinforcing bars S into the opening 260 between the first guide part 231A and the second guide part 232A, and presses the reinforcing bars S to the contact parts 234 of the contact member 233. Accordingly, the contact member 233 rotates about the shaft 236 as a support point, so that the second guide part 232A is pushed by the pressing part 235 and is moved from the open position to the closed position. The operator turns on the operation switch 160 in a state where the second guide part 232A is closed, so that a binding operation starts.

When the operation switch 160 is turned on, the pair of feeding gears of the wire feeding unit 220 rotates with sandwiching the wire W, thereby delivering the wire W from the wire reel 211 toward the curl guide 230A. The wire W fed by the wire feeding unit 220 is curled by the curl guide 230A, and the curled wire W is then wound several times around the reinforcing bars S. The number of winding times (number of turns) of the wire W around the reinforcing bars S can be set by the setting unit 150. The wire W wound several times on the reinforcing bars S is cut by the cutting unit and is then twisted by the twisting unit 250. By the above operations, the reinforcing bars S can be bound with the wire W.

Effects of First Embodiment

The grips 120R and 120L provided to the first body part 100 are positionally distant from the second body part 200, so that the center of gravity on the second body part 200-side of the reinforcing bar binding machine 1A also tends to be distant from the grips 120R and 120L. That is, the arrangement positions of the grips 120R and 120L do not coincide with the position of the center of gravity of the reinforcing bar binding machine 1A.

Here, the operator may perform an operation on the unstable reinforcing bars. In this case, the operator wants to bind the reinforcing bars without moving on the unstable reinforcing bars as much as possible. For this reason, the operator binds the reinforcing bars within the reach of the curl guide 230A while swinging the second body part 200 from front to back and from side to side, without changing a standing position. In this case, however, since the second body part 200 is heavy, the burden on the arm, shoulder and the like of the operator increases.

According to the first embodiment, since the pair of grips 120R and 120L is arranged on respective both sides of the axis line A1 and the like of the connecting part 300, as seen from the operator-side, the operator can grasp the grips 120R and 120L with both hands. Thereby, even when performing the operation while swinging the second body part 200 from front to back and from side to side without changing the standing position, the burden on the arm, shoulder and the like of the operator can be considerably reduced.

In addition, according to the first embodiment, since the battery mounting part 140 is arranged between the pair of grips 120R and 120L, as seen in the axis line direction D3 of the connecting part 300, the battery 142 can be arranged in the vicinity of the operator. For this reason, since the battery 142 that is a heavy product can be arranged in the vicinity of an operation support point (rotation support point) of the operator, the operator can easily swing the reinforcing bar binding machine 1A from front to back and from side to side about the second body part 200-side of the reinforcing bar binding machine 1A as an operation support point. Thereby, the operability can be improved.

Further, according to the first embodiment, since the battery mounting part 140 is arranged on the axis line A1 of the connecting part 300, a weight balance is further improved.

In addition, when the battery 142 is mounted, the battery 142 can be prevented from projecting from the first housing 102 toward the front surface-side. That is, when the second body part 200 is seen in the axis line direction D3 of the connecting part 300, the battery 142 can be made not to further project toward the front-surface side (outer side) than the curl guide 230A. Thereby, it is possible to secure the operator's visibility during the binding operation.

According to the first embodiment, since the battery mounting part 140 is arranged above the grips 120R and 120L, the battery 142 can be easily attached and detached.

Modified Embodiments of First Embodiment

Note that, in the reinforcing bar binding machine 1A of the first embodiment, the binding operation is enabled to start by turning on the operation switch 160. However, the present disclosure is not limited thereto. For example, instead of the configuration where the binding operation is enabled to start by turning on the operation switch 160, the binding operation may be enabled to start when it is detected that the reinforcing bars S are contacted to the contact member 233. In this case, the operability is improved because it is not necessary to turn on the operation switch 160 when binding the reinforcing bars S.

In addition, instead of the configuration where the binding operation is enabled to start when the reinforcing bars S are contacted to the contact member 233, the binding operation may be enabled to start when the reinforcing bars S are contacted to the contact member 233 in a state where the operation switch 160 is turned on. In this case, in the state where the operation switch 160 is turned on, the reinforcing bars S can be bound in succession, so that the operability is improved. Further, when the operation switch 160 is not turned on, the binding operation does not start even though the reinforcing bars S are contacted to the contact member, so that a careless binding operation can be suppressed from being executed. Note that, as a specific structure of the modified embodiment, for example, an actuation switch that is switched between on and off states according to the rotating operation of the contact member 233 may be arranged in the vicinity of the contact member 233, and when the actuation switch becomes on, the binding operation may be executed. Examples of the actuation switch include a mechanical switch and a sensor such as a Hall IC.

When binding the reinforcing bars S, the operator inserts the reinforcing bars S into the opening 260 between the first guide part 231A and the second guide part 232A in a state where the operation switch 160 is turned on. Thereby, when the reinforcing bars S are pressed to the contact parts 234 of the contact member 233 and the contact member 233 rotates about the shaft 236 as a support point and moves to an operation position, for example, a second switch becomes on. A control unit (not shown) provided in the second body part 200 starts the binding operation when both the operation switch 160 and the actuation switch are on. The second guide part 232A is moved from the open position to the closed position by the rotation of the contact member 233.

Second Embodiment

Figure 9:
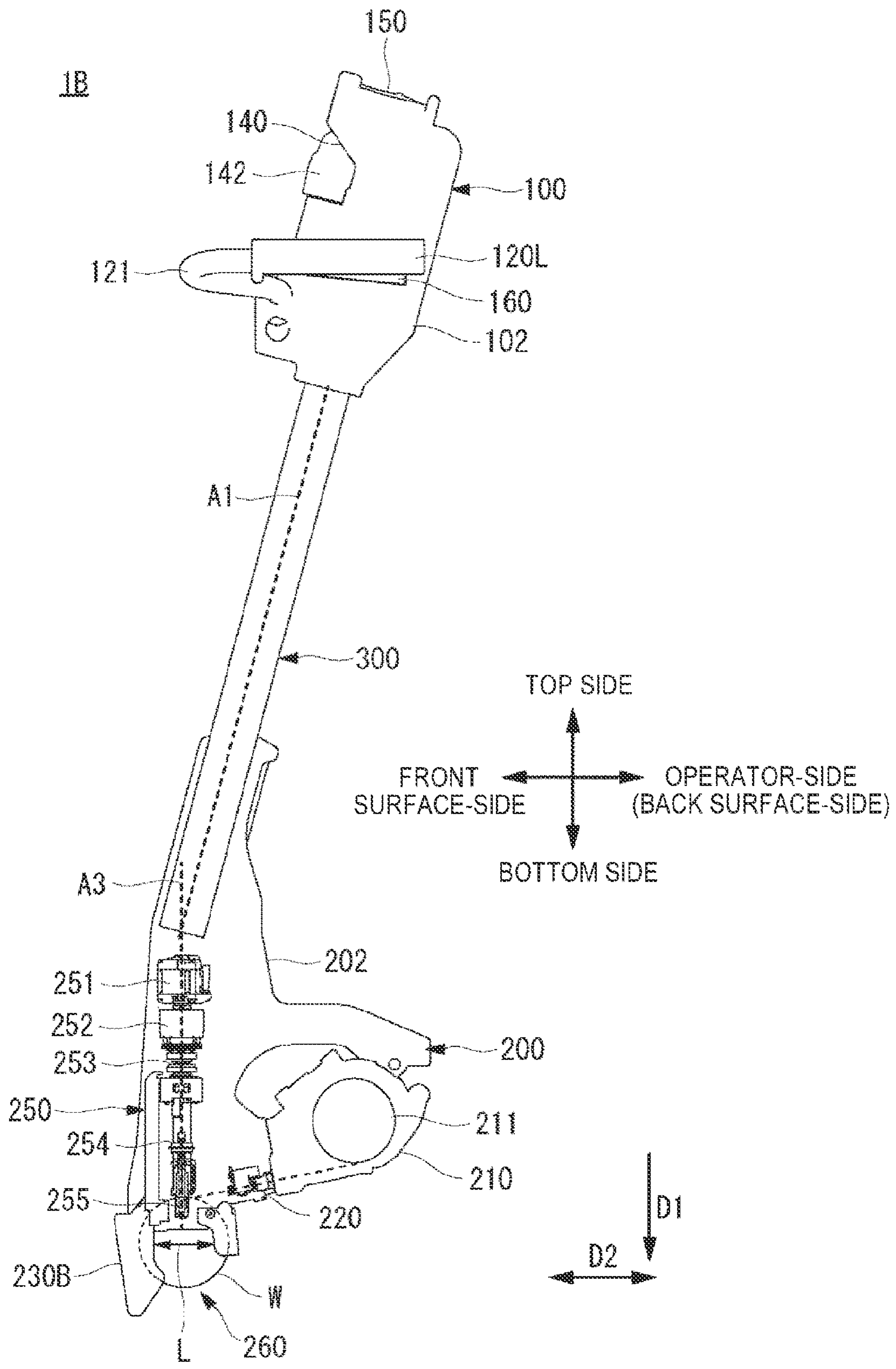
FIG. 9 is a side view depicting an internal configuration of a reinforcing bar binding machine of a second embodiment.

FIG. 9 is a side view depicting an internal configuration of a reinforcing bar binding machine 1B of a second embodiment. The reinforcing bar binding machine 1B of the second embodiment is different from the reinforcing bar binding machine 1A of the first embodiment, in that the contact member 233 is not provided. Since the reinforcing bar binding machine 1B is not provided with the contact member 233, the curl guide 230B is not opened and closed even when the reinforcing bars S are inserted and pulled out with respect to the opening 260. Note that, the reinforcing bar binding machine 1B has a similar configuration to the reinforcing bar binding machine 1A, except that the contact member 233 is not provided.

Note that, the technical scope of the present invention is not limited to the above embodiments, and includes a variety of changes made to the above embodiments without departing from the gist of the present invention. For example, the example where the battery mounting part 140 is provided on the axis line A1 of the connecting part 300 has been described. However, the battery mounting part 140 is not necessarily required to be provided on the axis line A1. For example, as shown in FIG. 8, the battery mounting part 140 may be provided on a virtual axis line A4, which includes the intermediate position P3 of the grips 120R and 120L and is parallel to each of the axis lines A2R and A2L of the grips 120R and 120L. In addition, the battery mounting part 140 may be provided at a position slightly deviating from the intermediate position P3.

The battery mounting part 140 may also be arranged between the grips 120R and 120L and the connecting part 300. When the battery mounting part 140 is arranged at the corresponding position, the space above the grips 120R and 120L can be omitted, so that it is possible to shorten the entire length of the reinforcing bar binding machine 1A and to improve the visibility.

The subject application is based on Japanese Patent Application No. 2018-168251 filed on Sep. 7, 2018, the contents of which are incorporated herein by reference.

REFERENCE SIGNS LIST

- 1A: reinforcing bar binding machine (binding machine)
- 100: first body part
- 102: first housing
- 120R, 120L: grip
- 140: battery mounting part
- 142: battery
- 200: second body part
- 202: second housing
- 220: wire feeding unit
- 230A, 230B: curl guide

231A: first guide part
232A: second guide part
250: twisting unit
253: twisting shaft
300: connecting part
A1: axis line of connecting part
A3: axis line of twisting shaft
S: reinforcing bar (binding object)
V1: first virtual plane
V2R, V2L: second virtual plane
W: wire

The invention claimed is:

1. A binding machine comprising:

a first body part having a pair of grips configured to be grasped by an operator;

a second body part having a curl guide configured to curl a wire around a binding object and a twisting unit including a twisting motor and a twisting shaft for twisting the curled wire; and a connecting part connecting the first body part and the second body part, wherein the pair of grips are respectively provided on both sides of an axis line of the connecting part or an extension line of the axis line, wherein the pair of grips extends in a front-rear direction which is substantially orthogonal to both a gravity direction that is an extending direction of a tip end of the curl guide and a width direction that is a symmetrical arrangement direction of the pair of grips with respect to the axis line of the connecting part, wherein the first body part has a battery mounting part to which a battery is mountable, and wherein the pair of grips includes a portion positioned closer to a front direction side of the binding machine than the battery mounting part in the front-rear direction.

2. The binding machine according to claim 1, wherein when an aligning direction of the pair of grips is set as a width direction, the battery mounting part is arranged between a pair of second virtual planes each of which is tangent to each of outermost ends in the width direction of the pair of grips and is orthogonal to a first virtual plane orthogonal to the twisting shaft.

3. The binding machine according to claim 2, wherein the battery mounting part is arranged between the pair of grips, as seen in an axis line direction of the connecting part.

4. The binding machine according to claim 1, wherein the battery mounting part is arranged on the extension line of the axis line of the connecting part.

5. The binding machine according to claim 1, wherein the battery mounting part is arranged between the pair of grips and the connecting part.

6. The binding machine according to claim 1, wherein when a gravity direction is set as a bottom side, the battery mounting part is arranged above the grips in a state where a tip end of the curl guide is faced toward the gravity direction.

7. The binding machine according to claim 1, wherein the battery mounting part is configured such that the battery can be mounted in a direction orthogonal or substantially orthogonal to the axis line of the connecting part.

8. The binding machine according to claim 1, wherein the battery mounting part is configured such that the battery can be mounted in an axis line direction or substantially in an axis line direction of the connecting part.

9. The binding machine according to claim 1, wherein the connecting part is an elongated hollow member and a wiring extends inside thereof, and power is supplied from the first body part to the second body part through the wiring.

* * * * *